United States Patent [19]

Munson

[11] 3,728,677

[45] Apr. 17, 1973

[54] ROTATION-INDEPENDENT READING OF RECTANGULAR INSIGNIA

[75] Inventor: John H. Munson, Menlo Park, Calif.

[73] Assignee: Stanford Research Institute, Menlo Park, Calif.

[22] Filed: May 10, 1971

[21] Appl. No.: 141,717

[52] U.S. Cl. .................... 340/146.3 F, 340/146.3 H, 340/146.3 ED, 340/146.3 D, 340/146.3 P

[51] Int. Cl. .......................... G06k 7/015, G06k 5/00

[58] Field of Search .............................. 235/61.11 E; 340/146.3, 146.3 F, 146.3 D, 146.3 H, 146.3 ED, 146.3 P; 250/219 I

[56] References Cited

UNITED STATES PATENTS

| | | | |
|---|---|---|---|
| 3,593,030 | 7/1971 | Jaskowsky | 235/61.11 E |
| 3,199,080 | 8/1965 | Rabinow | 340/146.3 D |
| 3,277,283 | 10/1966 | Rabinow | 340/146.3 K |

*Primary Examiner*—Maynard R. Wilbur
*Assistant Examiner*—Joseph M. Thesz, Jr.
*Attorney*—Lindenberg, Freilich & Wasserman

[57] ABSTRACT

A system is provided for scanning remotely encoded indicia, which may be in the form of a label on a package, and decoding same, regardless of the orientation, within wide limits of said indicia relative to a reader.

10 Claims, 9 Drawing Figures

INVENTOR
JOHN H. MUNSON
BY Lindenberg, Freilich & Wasserman
ATTORNEYS

INVENTOR
JOHN H. MUNSON
BY Lindenberg, Freilich & Wasserman
ATTORNEYS

INVENTOR
JOHN H. MUNSON
BY Lindenberg, Freilich & Wasserman
ATTORNEYS

INVENTOR
JOHN H. MUNSON
BY Lindenberg, Freilich & Wasserman
ATTORNEYS

ROTATION-INDEPENDENT READING OF RECTANGULAR INSIGNIA

BACKGROUND OF THE INVENTION

This invention relates to systems for recorded indicia and more particularly to improvements therein.

The problem of expediting materials handling in a manner to minimize the need for human intervention still exists. Numerous systems have been devised to achieve this end. Some of these systems require hand-held readers of special labels which are placed on the articles; in other systems, great care must be taken to insure that the articles pass through a detection zone with their labels properly positioned and oriented with respect to a reader.

DESCRIPTION OF THE PRIOR ART

In an application by Fennema et al., Automatic Non-contact Recognition of Coded Insignia, filed Apr. 1, 1971, Ser. No. 130,213, now abandoned and assigned to this assignee, there is described a system for reading coded indicia which is rotation-independent as well as substantially independent of the distance of the coded indicia from the detecting device. That system uses, by way of example, a label in which the code is in the form of concentric rings or rectangles. The printing of concentric rings or rectangles, while providing an information redundance which is very useful, poses some printing problems which would be avoided if the codes to be recognized could be printed in the form of rectangular insignia composed of parallel bundles of long, thin code lines. These are much easier to print amongst other reasons, because they can be printed incrementally as paper moves parallel to the direction of the code lines.

However, using rectangular insignia brings up the problem that the orientation of the insignia must be proper with respect to a reader or the insignia will either be improperly read or not read at all.

OBJECTS AND SUMMARY OF THE INVENTION

It is an object of this invention to provide a system for scanning and reading a rectangular insigne regardless of its rotation.

It is another object of this invention to provide a novel and unique rectangular-insignia reading system.

The foregoing and other objects of the invention are achieved in a system wherein the coded insignia are rectangular in form, that is, the code consists of parallel bundles of lines which move through a detection zone. A scanning light system is provided in the detection zone consisting of two intense and substantially non-diverging light beams which sweep out two planes in space which intersect with the plane of the insigne and with each other at nominally right angles. Furthermore, the scanning planes and hence the scan lines are angled at ± 45° with the direction of motion of the insigne.

As a conveyor moves it displaces the insigne relative to the two scanning planes. Photocells detect the changing light as a result of the scanning and generate electrical signals representative thereof which are applied to logic circuitry. The logic circuitry determines whether the signals which represent a scan of the encoded insignia constitute a correct code, and if so they are processed further.

The coded insignia which are described herein, are also unique in providing a coding arrangement which indicates the direction that the code has been read as well as the correctness of the code.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
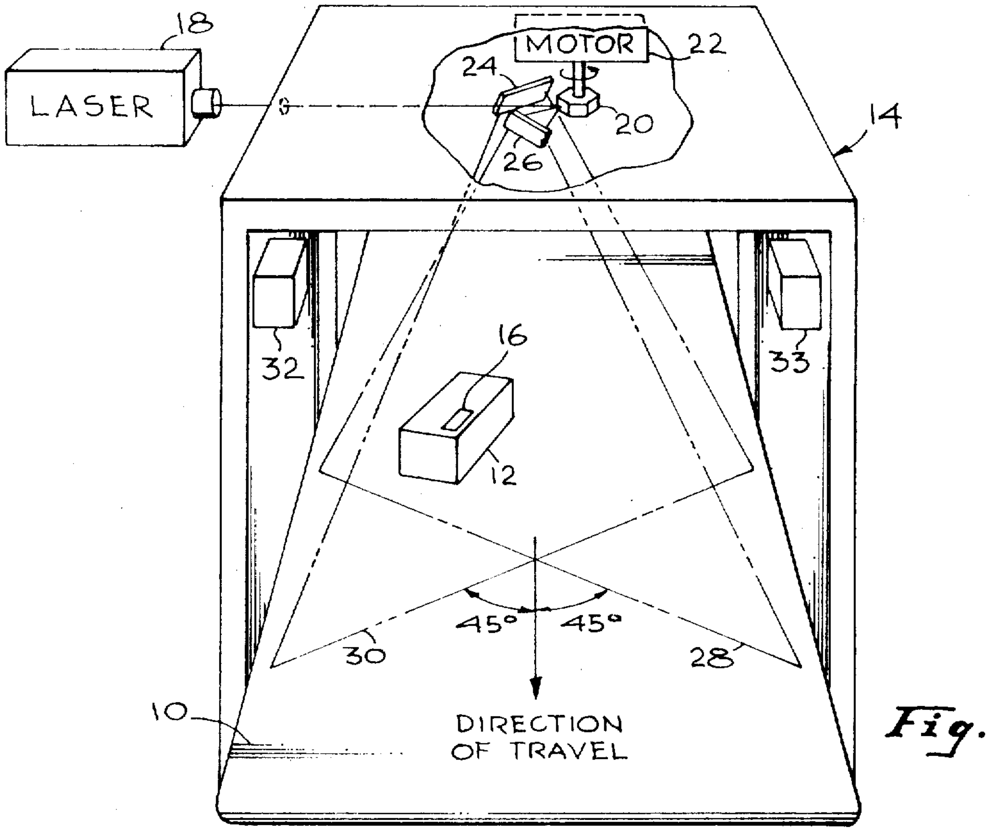
FIG. 1 is a perspective view illustrating a scanning arrangement in accordance with this invention.

FIG. 1 is a perspective drawing of an arrangement for detecting a rectangular coded insigne regardless of its orientation and tilt angle with respect to the scanning planes and also regardless of distance with respect to the detecting photocell. A moving conveyor 10 carries packages such as the illustrative one 12, through a detecting region, exemplified by the tunnel 14. The package or article 12 will have a rectangular coded insignia 16 thereon of a type to be described. A narrow, intense, substantially non-diverging light beam is provided from a source such as a laser 18. The light beam output of the laser is aimed at a rotating many-sided mirror 20, which is rotated by the motor 22. The light beam is reflected from one of the mirror surfaces onto two deflecting mirrors respectively 24, 26. These deflecting mirrors are positioned and angled to cause the light beam to sweep out two vertical planes respectively 28, 30, which intersect substantially at right angles with one another and make an angle of 45° respectively with a line indicating the direction of travel of the conveyor 10 through the intersection of the two light planes 28, 30. Two light beam sources with two rotating mirrors can be used to generate the two light planes but it will be appreciated that using a single laser is less expensive, and also avoids the problem of synchronizing two rotating mirrors.

Different colored light signals radiated from the indicia 16, when illuminated by the light beam, are received by the photocell circuits 32, 33. The photocell circuits are connected to logic circuits (not shown here) which check the received signals and if they are truly representative of the code proceed to decode them.

Figure 2:
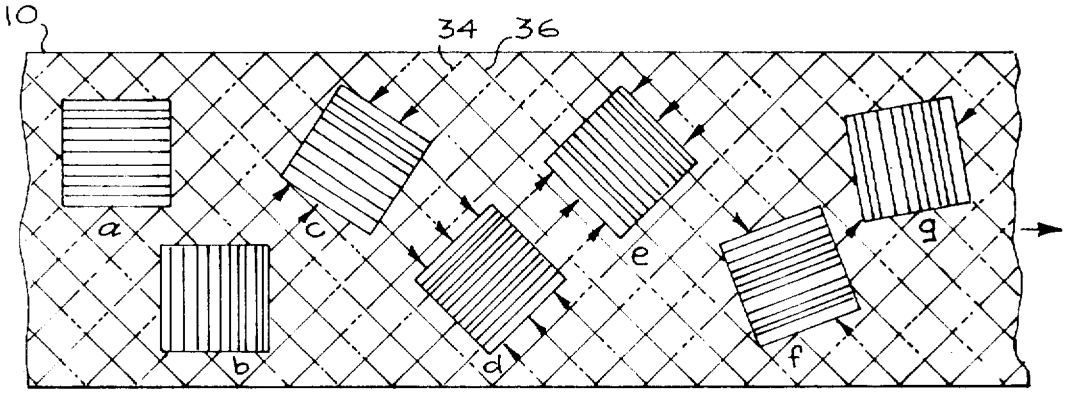
FIG. 2 illustrates the scanning lines provided, in accordance with this invention, and random positions of rectangular indicia which are scanned thereby.

As the conveyor moves, it displaces the insignia relative to the two scanning planes, generating a double set of scan lines relative to the conveyor. These are represented in FIG. 2 by the diagonal lines 34, 36. The square coded insignia *a*, *b*, *c*, *d*, *e*, *f*, *g*, are shown in a number of different positions on the conveyor 10 to illustrate that for random positions and orientations of the square insignia one set of scan lines or the other will tend to have lines that encounter the entire code, (shown by the pairs of arrows), except that in and about the worst case orientation represented by the rectangular insignias *a* and *b*, the full code may be missed because of the finite gaps in the scan line families.

This situation can be easily rectified by making the insignia longer (in the direction of the code lines) that they are wide, after arranging the scan lines 34, 36, to be as close together as is practicable. The excess length should be sufficient to exceed the sum of the following terms with a margin of safety:

1. the separation of the scan lines, multiplied by the square root of 2, to account for the gaps in the scan line families;
2. an additional distance equal to (1) above, to insure two successive complete scans for error checking (or S−1 such distances, to insure S scans); 3. tolerance for the scan spot size;
4. allowance for possible obliqueness of the two scan line families, owing to deviation of the insignia from horizontal and/or the fact that the two scan planes are not exactly vertical or perpendicular.

In the preferred embodiment, the indicia or coded elements in a insigne are represented by the presence or absence, in a particular pattern, of a certain ink or material which is called the information ink. One or more photocell circuits, called the information ink detector, are specially matched for receiving the light radiated (or otherwise characteristically generated or suppressed) when the information ink is struck by the scanning beam, and thus generating an electrical signal signaling the degree of presence or absence of information ink. For reasons of reliability well known in the information processing arts, the information ink detection signal presented to the logical portion of the system is limited to a binary range of values; i.e., the signal either specifies that information ink or is not present at the point scanned by the scanning beam at any time.

It is readily appreciated that, in order to specify a useful number of distinct codes, the transitions in the binary information ink detection signal as the beam sweeps through the scanning zone must be related to a synchronizing or time scale generated through some other means. It may also be appreciated that the scanning beam encounters the sequence of parallel code lines at differing rates for reasons including at least different orientations of the insigne, different locations of the insigne in the scanning zone, and different tilts of the insigne. Although with proper design of insigne and logic such variability could be countered with a timing mechanism built into the scanning system and independent of the insigne, the preferred embodiment derives its time scale from a second ink or material on the insigne, called the timing ink, and from a second photocell circuit or set of circuits specially matched to receiving light radiated or otherwise affected when the scanning beam strikes the timing ink, which is called the timing ink detector.

Figure 3:
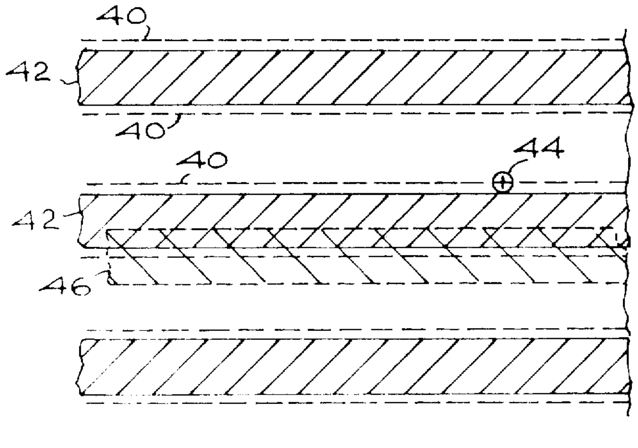
FIG. 3 and FIG. 4 illustrate code and timing bars in accordance with this invention.
Figure 4:
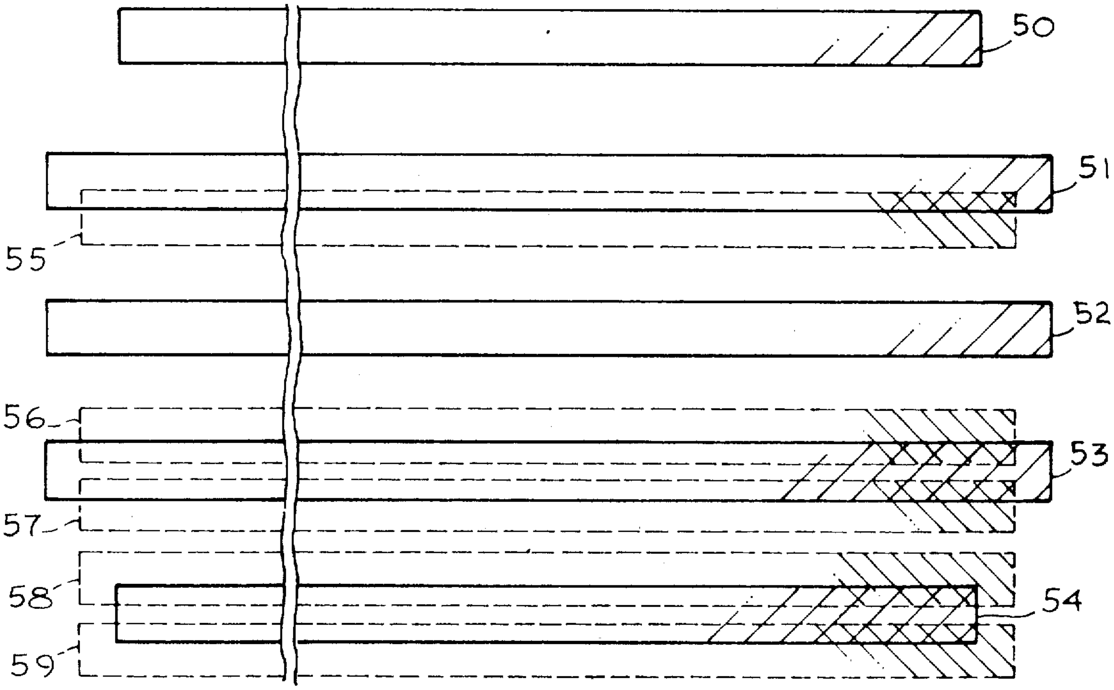

FIGS. 3 and 4 exemplify an arrangement for timing ink bars and information ink bars used in the indicia in accordance with this invention. The inks which are employed may be those which are caused to fluoresce in response to stimulation by the laser light beam and of course the colors for the timing ink bars and the information ink bars are different.

The loci at which the transitions of the timing ink photocell detector normally occur are the evenly spaced dashed lines, such as 40, represented in FIG. 3. The timing ink bars 42, themselves, are the regularly spaced bars which are cross-hatched upward to the right. A scanning spot 44, is represented by its effective diameter, such that if any part of a timing ink bar falls within that diameter the timing ink detector will register the presence of ink. The scanning spot is shown positioned at a transition point. A single bar or element of information ink 46, is shown centered on the transition locus just below the scanning spot. The information ink bar is cross-hatched upward to the left. Other bars of information ink, representing ones, may similarly be centered on the appropriate transition loci. It may be appreciated that this arrangement gives maximum tolerance against signaling the presence of information ink of a given bar when the spot encounters an adjacent transition locus, and against failing to signal it when the appropriate locus is encountered.

In practice, the timing ink pattern would probably be printed in the form of solid bars by conventional printing means. The information ink might well be laid down in a dotted or striated or otherwise non-solid pattern, in order to let the timing ink show through. It is to be noted that such patterns are generally considered preferable to solid ones for ink transfer in impact printing, as commonly employed in computer line printers. Alternatively, or in addition, the information ink may be diluted to decrease its ability to obscure the timing ink.

In considering the use of patterns with lines that have ends (as opposed to the concentric designs), one must deal with the problem of marginal detection at the ends of the lines. It would be undesirable for the scanning spot to be able to graze along the edge of the code region, detecting the transitions along the (ends of the closed) timing bars but missing the tips of any information bars. A response to this problem consists of making the timing bars a small amount shorter than the information bars at each end. Alternatively, only the two outermost timing bars need be shortened, it being assumed that a sweep of the beam must encounter both of these bars (and all the intervening ones) to satisfy the detection logic that a valid reading has occurred.

There will always be a marginal region at the ends of the outermost timing bars where the two transitional loci for a given bar converge. Thus if the two information-ink elements assigned to an outermost timing ink bar do not have the same values, occasional errors are unavoidable. To avoid such errors it is proposed to require that both information elements in such pairs have the same value. Thus, in a pattern with N timing bars, there are only 2(N−1) rather than 2N free choices for the information elements. Alternatively, in practice, one might allow such errors to occur and depend on the fact that the code must be scanned twice identically in succession to be accepted.

By way of illustration, a complete code region is shown in FIG. 4. The areas in which timing ink is applied are shown in solid outline and have reference numerals 50, 51, 52, 53 and 54 applied thereto. There are five (equals N) bars of timing ink; hence, 10 transition loci. The two outermost timing ink bars are shorter than all of the other bars in the design. (The information ink bars could be longer; they are shown shorter than the other timing bars to indicate their minimum length, and also for clarity). The information ink bars are represented by the dotted lines 55, 56, 57, 58, and 59. Reading from the top, the sequence of information elements represented by the example is 0001001111. Deleting the outermost elements, which by assumption must be the same as their nearest neighbors, we retain a code of 00100111.

Under the assumption that the label can be arbitrarily oriented relative to the scanner, the code itself must tell the scanner logic whether the code is being encountered forward or backward. To put it another way, codes which are palindromes of each other must not be treated as distinct. Ordinarily $2^{2M}$ distinct codes can be represented by codes of 2M bits. For the reasons stated, however, the number of distinct codes is only one-half times $(2^{2M}+2^{M})$; where $M = N - 1$, i.e., half of the former number, plus a term to account for those few codes that are their own palindromes.

Decoding the maximum possible number of distinct codes would require quite complex circuitry in the detector. A much simpler scheme is to use, for example, the first and last bits of the code to specify the direction (e.g., to require that the code being with a 0 and end with a 1.) The usable code yielded by the system thus consists of the remaining 2M−2 bits allowing $2^{2M-2}$ distinct codes. In the previous example, if the scanner encountered the code sequence 00100111, it would produce the usable code 010011. If, reading the label from the other end the scanner encountered the code sequence 11100100 it would sense the inversion and reinvert the "usable" code to produce 010011. This use of the two outermost code bits also provides an error check. A code is not acceptable if bits are both 1 or both 0.

It may be observed that for any possible straight line path of the scanning spot across a code region, referring to FIGS. 3 and 4, it is impossible for three successive transitions of the information ink detector to occur without any intervening transition of the timing ink detector. Not only is this true in the ideal, but it should be readily achievable in practice with appropriate smoothing and hysteresis-introducing circuitry in the detector, to account for imperfections in printing.

The fact that this class of event (three or more information ink transitions without an intervening timing ink transition) cannot occur during the reading of a code allows us to use such an event for a special purpose; in particular to define or delimit the field in which a code may be found. To do this, it suffices to surround the code pattern field with a double ring of information ink. The scanning beam, in entering the field bounded by the ring, will cause a quadruple transition of the information ink detector, and similarly when exiting.

Figure 5:
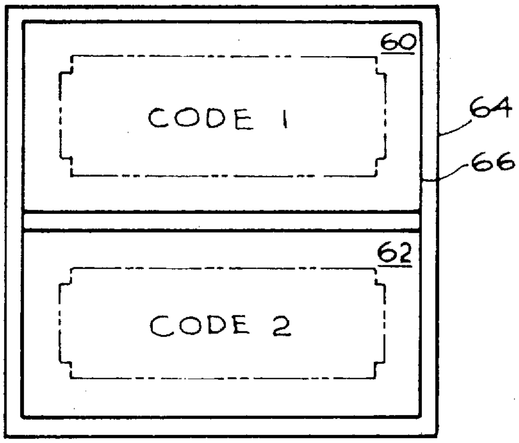
FIGS. 5 and 6 illustrate codes or coded indicia field arrangements in accordance with this invention.
Figure 6:
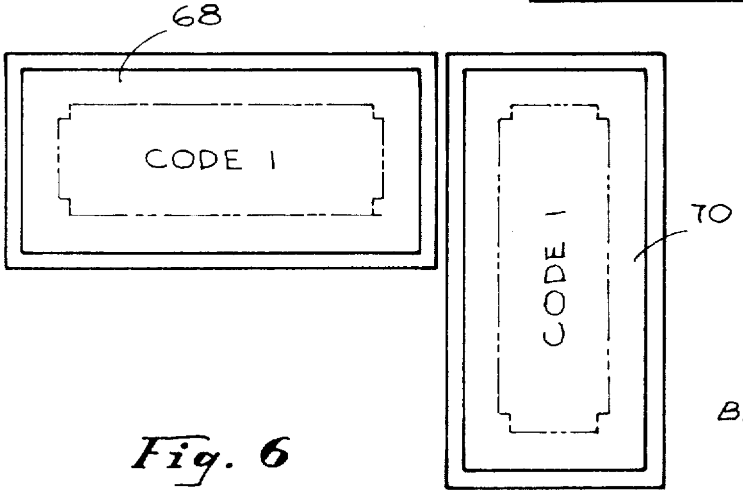

FIGS. 5 and 6 illustrate field defined codes. In FIG. 5, each array of coded indicia 60, 62, is enclosed in two field defining marks respectively 64, 66 which have the same color as information ink. FIG. 5 shows one field defined code above another; FIG. 6 illustrates two field defined code regions respectively 68, 70, which are at right angles to one another and which contain the same code.

Detection of such a field defining event should cause the system to do the following:

1. analyze the code bit sequence (if any) received since the last such event; if it passes all tests, accept and output it as a validly read code.
2. reset all circuits, buffers, etc. as appropriate for future reception of code.

The field defining marks can serve two valuable functions. First they can serve to isolate the code region from any and all extraneous signals that might come from locations other than the label itself, in particular from the package to which the label is attached. This is important because, in a truly asynchronous detecting system, there is no way to separate extraneous signals from the valid ones occurring during a given sweep of the scanning spot. Thus a drop of timing ink or a particular dye on the package, if not isolated from the code, could destroy the validity of the code or, worse still, could combine with a fragmentary scan of the code to produce an erroneous output.

Secondly, the field defining marks allow the placing of multiple code fields on a single label. One possible use of this would be to fit additional information on the label within a given constrained area. For example, two distinct code regions, each approximately twice as long as wide, could be fitted into a given square area, as shown in FIG. 5. Another use would be to allow a code field to be repeated in different orientations, as shown in FIG. 6, thus allowing non-concentric codes to be read with a scanner which otherwise would require a concentric code such as formed by indicia in the form of concentric rings or rectangles.

Figure 7:
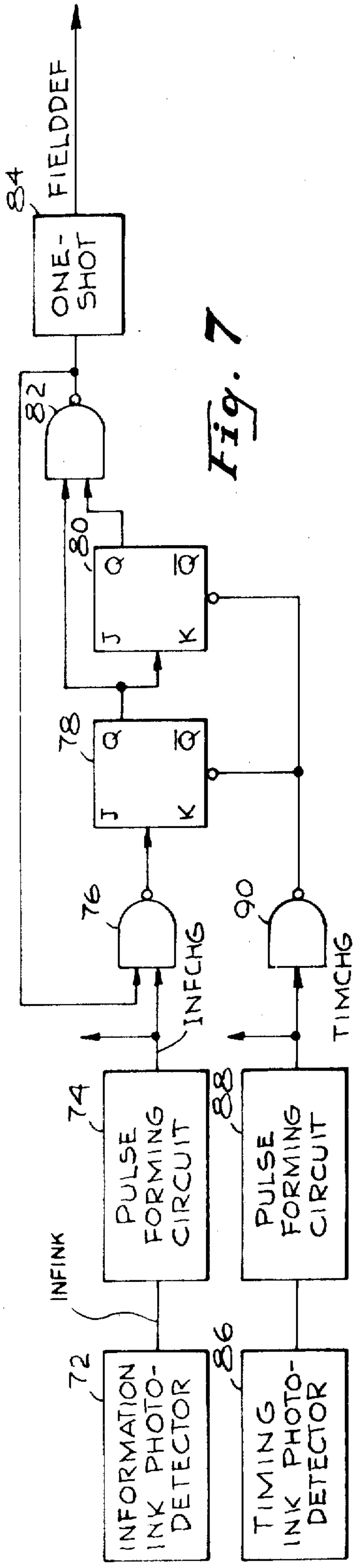
FIG. 7 is a block schematic diagram of the input circuits to the logic circuit arrangement of this invention.

The logic for detecting and making use of the field defining marks is shown in FIG. 7. An information ink code detector 72 applies its output, which is designated as INFINK, to a pulse forming circuit 74. The output of the pulse forming circuit which is given the designation INFCHG (representing information ink change) is applied to a NAND gate 76. The output of the NAND gate is applied to a four stage counter comprising the toggle flip-flop 78, the Q output of which drives the second toggle flip-flop 80. The Q output of flip-flop 78 is also applied to a NAND gate 82, whose other required input is the Q output of flip-flop 80. The output of the NAND gate 82 is applied to a one-shot circuit 84, and also to the NAND gate 76 as its second required input. The output of the one shot 84 is a signal labeled FIELDDEF.

Timing ink bars are detected by timing ink photodetector 86. The output of the photodetector is applied to a pulse forming circuit 88, whose output is designated as TIMCHG indicative of a change in state of the timing ink detector. The TIMCHG signal is applied to a NAND gate 90, acting as an inverter. Its output is applied to the flip-flops 78 and 80 causing them to be reset if they are not already so.

The operation of the circuit shown is as follows: Any signal arising as a result of a timing ink transition resets the two flip-flops 78, 80, to 0. The first signal caused by detecting an information ink transition causes the counter, if in state 0 to be set to state 1. If the counter is in state 1 then the detection of an information ink transition sets it to state 2, if in state 2 the counter is set to state 3. If the counter is in state 3, then the detection of an information ink transition causes it to remain in state 3.

At any time that the counter passes from state 2 to state 3, the Q output of flip-flop 80 together with the Q output of flip-flop 78 cause the NAND gate 82 to drive the one shot 84 producing an output signal designated as FIELDDEF.

It should be recognized from the foregoing that the field defining marks will produce in sequence three or more counts of the counter whereby the FIELDDEF signal is generated indicative of this fact. The FIELDDEF signal is generated only once during any long uninterrupted sequence of information ink transitions. Other designs are readily possible with other features, for example, a counter with a greater number of states, requiring a greater number of information ink transitions to generate FIELDDEF, corresponding to the use of a field defining mark consisting of more than two rings.

The logic for code gathering and checking must perform the following functions. First it must acquire a sequence of code bits during a defined interval of time. This interval of time may be a single sweep of a scanning ray through the scanning region, as determined by auxiliary photodetectors mounted in the detection tunnel. In the preferred implementation to be described, however, the interval of time is bounded by the occurrence of the FIELDDEF signal, which narrowly limits the interval to the scanning of the field in question and thus discriminates against extraneous occurrences.

When the time interval for code gathering is complete, the validity of the received sequence of bits is checked, and this includes a check on the length of the bit sequence and parity-type checks on the outermost bits. A bit sequence failing the length test because it is too short will be considered a fragmentary reading of the code and will be ignored. A sequence that is too long, or fails the parity type checks, should cause an error indication although it should not abort the attempt to acquire two successive identical valid codes.

Next, from each valid code, it should be determined whether the code was read forward or backward. If backward the bit sequence should be reversed.

Finally, each properly oriented code which is accepted should be stored and compared with the next subsequent oriented code accepted. If the two are identical, the code should be accepted as a verified reading of the label at hand. If two consecutive oriented codes, gathered during the passage of the same package, differ, an error condition is reported. Failure of this test indicates either a failure of the coding and detection system or the presence of more than one package, not properly separated, on a conveyor.

Figure 9:
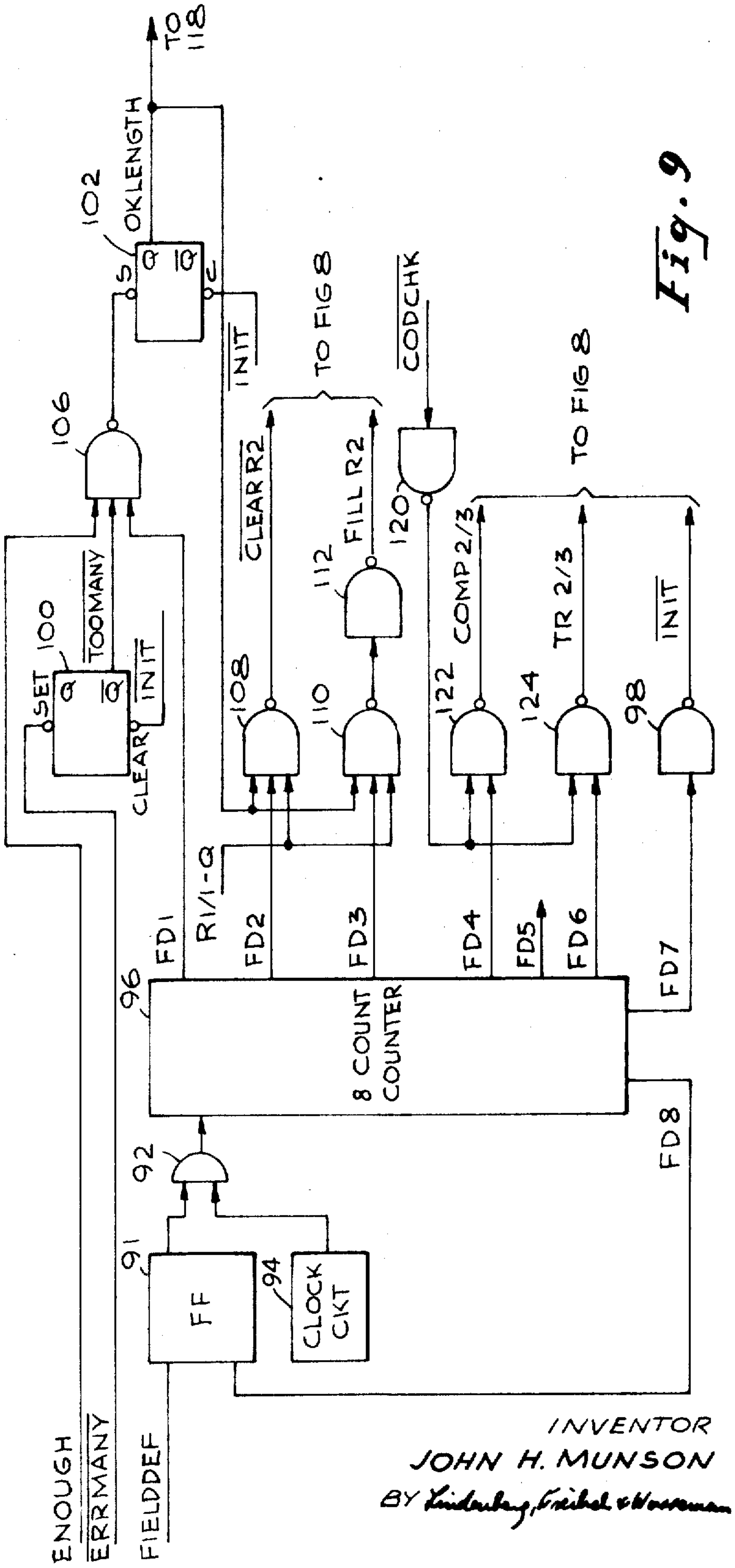
FIG. 9 is a block schematic diagram of a logic gating arrangement in accordance with this invention.
Figure 8:
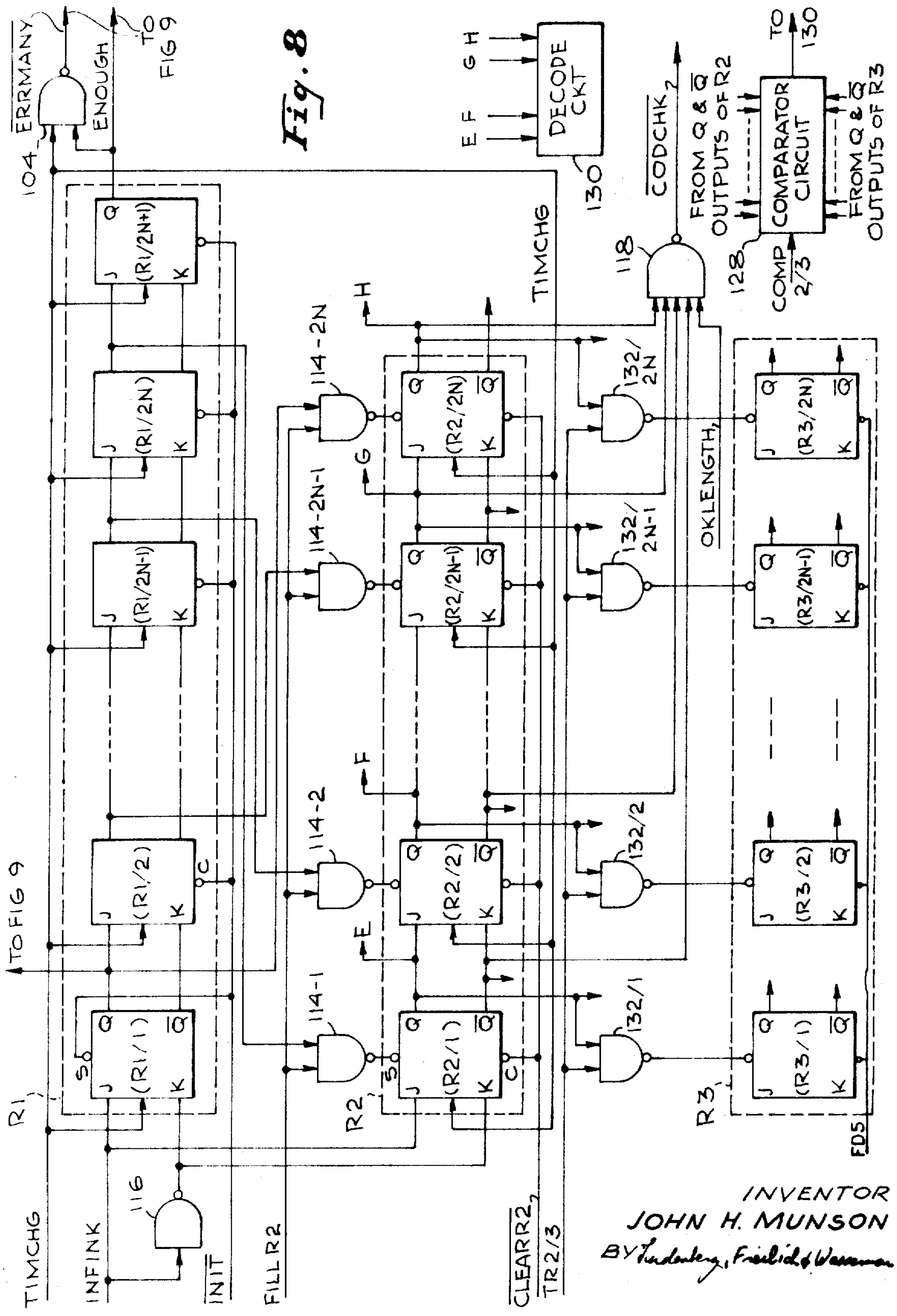
FIG. 8 is a block schematic diagram of registers employed in accordance with this invention.

FIGS. 8 and 9 show the circuitry for accomplishing the functions just described. A shift register, designated as R1, includes flip-flop stages R1/1 through R1/2N+1. A second shift register, designated as R2, includes shift register stages R2/1 through R2/2N. A third register, designated as R3, contains flip-flops R3/1 through R3/2N.

The lengths of the registers are determined as follows. Let the number of timing ink bars in the code field be N, so that the number of transition loci encountered in the full scan of the code is 2N. Then register R1 has a length of 2N+1 bits and R2 and R3 are each 2N bits in length. Clock signals for shifting bits through shift register R1 are provided by the TIMCHG signal output of pulse forming circuit 88. In FIG. 9, the occurrence of the FIELDDEF signal, which is the output of one shot 84, drives a flip-flop 91 to its set state. This enables an AND gate 92, whereby a clock circuit 94, can drive an 8 count counter 96, through its 8 count states designated as from FD1 through FD8. The 8th count state, FD8 resets the flip-flop 91 whereby the AND gate 92 is closed. Upon the occurrence of the 7th count of the counter, designated as FD7, an inverter 98, inverts this signal and its output is designated as $\overline{\text{INIT}}$. The occurrence of this $\overline{\text{INIT}}$ signal clears two flip-flops 100, and 102, and also, in FIG. 8, sets the first flip-flop in register R1, designated R1/1. thereby causing it to represent a 1, and clears the remaining R1 flip-flops to their 0 states.

Timing ink transitions (TIMCHG) provide the clock pulses required to shift information ink values (INFINK) into registers R1 and R2. The INFINK signal, it will be recalled, is the output of the detector circuit 72 in FIG. 7. The original 1 bit in register stage R1/1 travels ahead of the INFINK values. If more than 2N successive clock signals occur, then a NAND gate 104, in FIG. 8 is enabled, producing as its output a signal designated as $\overline{\text{ERRMANY}}$. The $\overline{\text{ERRMANY}}$ signal sets the flip-flop 100 thereby causing its Q output to go high. The $\overline{\text{Q}}$ output of flip-flop 100, designated as $\overline{\text{TOOMANY}}$, is applied to a NAND gate 106. NAND gate 106 also has, as its other two inputs, an FD1 signal that is the first count of counter 96, and the ENOUGH signal, which is the Q output of the last stage of shift register R1. The presence of a $\overline{\text{TOOMANY}}$ signal caused by $\overline{\text{ERRMANY}}$ blocks NAND gate 106.

If their are not present an excessive number of clock signals (more than 2N) then, no $\overline{\text{ERRMANY}}$ signal is generated. As the scanning light beam exits from the code field, it again passes through the field-defining rings whereby another FIELDDEF signal is generated. The eight count counter 96 is again caused to count through its eight states. The conjunction of the FD1 output of that counter and the ENOUGH signal, causes NAND gate 106 to set flip-flop 102. The Q output of flip-flop 102, designated as OKLENGTH, indicative of the fact that the length of the code which has been collected is acceptable, applies one input to two NAND gates 108 and 110, as shown in FIG. 9.

The next procedure is to determine if the code is properly oriented, and if it is not, to orient it properly. If, at this time, register stage R1/1 contains a 1 and the OKLENGTH signal is present, which is the Q output of flip-flop 102, then, upon the occurrence of the count FD2, NAND gate 108 produces an output $\overline{\text{CLEARR2}}$ which clears the register R2.

Upon the occurrence of the FD3 signal from counter 96, then NAND gate 110 can produce an output which is inverted by the NAND gate 112. This output, designated as FILLR2, enables register R2 to be filled in reverse order from stages 1 through 2N of register R1. This is achieved by applying the FILLR2 signal to NAND gates respectively, 114–1, 114–2, . . . , 114–2N–1, 114–2N. The NAND gates are enabled thereby so that NAND gate 114–1 can transfer the state stored in flip-flop stage R1–2N to Rs–1, if it is a one. NAND gate 114–2 transfers the state of shift register stage R1/2N–1 into R2/2. NAND gate 114–R1–1 transfers the state of R1/14 2 into R2/2N–1. NAND gate 114–2N transfers the state of shift register stage R1/1 into R2/2N, and similarly for intervening stages not shown.

If the shift register stage R1/1 contained at 0 at the time of the FD2 and FD3 counts, then neither the clearing nor the transferring operation just described would occur since the shift register R1 contained the code in the proper orientation. Then, shift register R2 would already be storing the same code as is entered into shift register R1 from the INFINK signals. Note that the NAND gate 116, in FIG. 8, acting as an inverter, enters 0's into the first stage of registers R1 and R2 in the absence of an INFINK signal.

Next, is the test for whether or not the code in the shift registers is valid and oriented. This is done by a NAND gate 118, in FIG. 8 which tests whether the first and second stages of shift register R2 contain 0's and whether the last and next to last shift register stages of register R2 contain 1's. If this is the case, then the NAND gate 118 provides an output, designated as $\overline{\text{CODCHK}}$. This signal indicates that the code in R2 is valid as well as oriented.

The $\overline{\text{CODCHK}}$ signal is applied to a NAND gate 120, on FIG. 9, which inverts its input and applies it to two NAND gates 122 and 124. In the presence of the fourth count, designated as FD4, NAND gate 122 can provide an output designated as COMP 2/3. This signals that the contents of register 2 should be compared with the contents of register 3. It will be recalled that the code is read twice by means described earlier. Register R3 serves to store the contents of the previous reading. Thus, if register R3 had previously received the contents of register R2 and they are the same as the contents of register R2 now being compared to the contents of register R3, the system will be able to accept the code in register R2, decode it, and process it.

A comparator circuit 128 compares the contents of registers R2 and R3 in the presence of the COMP 2/3 signal. It has the Q and $\overline{Q}$ outputs of the registers applied thereto and when the COMP 2/3 signal occurs, if the contents are identical the comparator produces an output which enables the code circuit 130 to receive and process the contents of register R2, which are applied thereto. In the absence of an output from NAND gate 128, the code circuit 130 cannot function.

The occurrence of the FD5 count resets or clears register R3. Whether or not the contents of register R2 and R3 are indicated as the same, the contents of register R2 are transferred into register R3 upon the occurrence of the FD6 count. The FD6 count enables NAND gate 124 (FIG. 9) to produce an output, designated as TR23, which enables NAND gates 132–132–N to transfer the contents of register R2 into the corresponding stages of register R3.

Upon the occurrence of the FD7 count, NAND gate 98 provides the $\overline{\text{INIT}}$ signal again which clears the flip-flops 100 and 102, puts a one in the first stage of register R1 and clears the remainder of the register, preparatory for the next code reading operation. The FD8 count resets flip-flop 91 again cutting off clock pulses to the counter 96 until the occurrence of the next FIELDDEF signal.

The code arrangement shown in FIG. 5 may be processed by the system described with some minor additions. The code used in each field must reserve one bit position to identify whether the code read is Code 1 or Code 2. For example, if the bit is "0" then Code 1 has been read, if "1" then Code 2. Thereafter an additional register R3' is employed. The code identifying bit in Register R2 is sensed and the contents of R2 are transferred to R3 or R3' depending upon the results of the sensing operation. Two comparator circuits are employed and the contents of R2 are compared with the contents of R3 or R3' depending upon the results of the sensing operation.

From the foregoing description, it will be appreciated that a system has been provided whereby coded indicia in the form of a rectangular insigne, including parallel code bars, can be read regardless of the position and orientation and tilt angles with which they are presented to the detecting equipment, that is as long as the label can be "seen" by the light source and photodetectors of the detecting equipment. The code which is read is checked for length, orientation, validity, and is also read redundantly to insure its validity.

What is claimed is:

1. A system for reading a coded insigne which is upon an article moving past detecting means, regardless of the orientation or proximity of said coded insigne with respect to said detecting means, comprising:

high intensity substantially non diverging light beam means emitting a light beam, movable mirror means positioned to receive said light beam and to reflect it in a manner to describe two intersecting planes through which said article is moved, photocell means positioned for receiving light signals from said coded insigne as it passes through said two intersecting light planes and providing two sets of electrical signals representative of the code on said insigne resulting from at least two scannings of said coded insigne by said light beam, error checking circuit means to which said two sets of electrical signals are applied for checking code validity, including means for comparing the two sets of electrical signals for identicality and producing an output signal if code validity and means for the comparison are acceptable, and means responsive to said output signal for utilizing one of said sets of said electrical signals.

2. A system for reading a coded insigne as recited in claim 1 wherein said coded insigne includes region marks encircling a coded indicia region, said photocell means generates region signals responsive to light signals from said region marks, and said error checking circuit means includes means for enabling said error checking circuit means to become operative in response to said region signals.

3. A system as recited in claim 1 wherein said error checking circuit means includes a first means for storing one of said two sets of electrical signals, means for testing whether said stored set of electrical signals is stored in a proper or reverse alignment, and means responsive to said means for testing indicating that the alignment of said stored electrical signals is in reverse for reversing said stored electrical signal alignment to render it proper.

4. A system as recited in claim 3 wherein said means responsive to said means for testing for reversing said stored electrical signal alignment includes a second means for storing a set of electrical signals and means for transferring said stored electrical signals from said first to said second means for storing in a reverse order.

5. A system as recited in claim 1 wherein said mirror means is positioned to receive said light beam and to reflect it in a manner to describe two light planes intersecting at right angles.

6. A system for reading a coded insigne which is upon an article moving past detecting means, regardless of the orientation or proximity of said coded insigne with respect to said detecting means, comprising:

high intensity substantially non diverging light beam means emitting a light beam, mirror means positioned to receive said light beam and to reflect it in a manner to describe two planes through which said article is moved, photocell means positioned for receiving light signals from said coded insigne as it passes through said two light planes and providing two sets of electrical signals representative of the code on said insigne resulting from at least two scannings of said coded insigne by said light beam, a first, second and third register means, means for entering a set of electrical signals simultaneously into said first and second register means, means for applying said first set of electrical signals to said means for entering, means for testing whether the set of electrical signals stored in said first register means is in the proper or reverse order and producing a reversing signal when the order is in reverse, means responsive to said reversing signal for clearing said second register means, means responsive to said reversing signal for transferring the contents of said first register means to said second register means in reverse order, means for checking the validity of the contents of said second register and producing a validity signal if the validity is accepted, means for comparing for identicality the contents of said third register means with the contents of said second register means responsive to said validity signal and producing an identicality signal when they are the same, means for utilizing the contents of said second storage means in response to said identicality signal, and means for transferring the contents of said second register means into said third register means after said means for comparing has operated, and means for applying said second set of electrical signals to said means for entering.

7. A system as recited in claim 6 wherein said coded insigne represents a binary code wherein when said code is in the proper order a "one" binary bit is at one bit position and a zero binary bit is in another bit position, and said means for testing whether the set of electrical signals stored in said first register means is in the proper or reverse order includes gate means for detecting the presence of said one and zero binary bits in said one and another bit positions and producing a reversing signal when they are not.

8. A system as recited in claim 6 wherein said coded insigne includes region marks defining the area of a coded indicia region and timing marks within said coded indicia region, and said coded indicia represent a binary code having 2N bits, said photocell means generates timing pulses responsive to said timing marks and a region defining signal responsive to said region marks as said article passes through said two light planes, said first shift register means having 2N+1 stages, means responsive to said region marks for clearing said first shift register means and introducing a signal representing a "1" binary bit into its first stage, means for shifting the signals being entered into said first shift register means from its first stage to its 2N+1 stage responsive to said timing pulses, and gate means responsive to a timing pulse and said 2N+1 stage of said first shift register storing a signal representative of a "1" binary bit for producing an error signal indicating the occurrence of an error, and means responsive to said error signal for aborting further operation of said system.

9. A system as recited in claim 8 wherein said means responsive to said region marks for clearing said first shift register and introducing a one bit into its first stage includes counter means for counting said region marks and producing a mark signal upon attaining a predetermined count, and means responsive to said mark signal for driving the first stage of said first shift register to its one representative state and the remaining stages of said shift register to their zero representative states.

10. A system for reading an insigne applied to an article moving past detecting means, wherein said insigne includes region marks enclosing a coded indicia region, said coded indicia region including timing marks and marks representative of an N bit binary code, said system comprising:

high intensity substantially non diverging light beam means emitting a light beam, mirror means positioned to receive said light beam and to reflect it in a manner to describe two intersecting light planes through which said article is moved, photocell means positioned for receiving light signals from said insigne as said article passes through said light planes for providing for each light plane region signals responsive to said region marks, timing signals responsive to said timing marks and N binary code signals responsive to said N bit binary code marks, a first counter means for counting a predetermined number of said region signals and producing a region count signal output, second counter means responsive to said region count signal for producing a plurality of output counts, first, second and third register means, said first register having 2N+1 stages and said second and third registers having 2N stages, means responsive to a last of said second counter means output counts for transferring the first stage of said first register into its one representative state and clearing the remaining stages of said register, means responsive to the output of said photocell means for entering binary code signals simultaneously into said first and second register means timed by the timing signals, gate means responsive to the presence of a timing signal and the 2N+1 stage representing a one bit to produce an error signal, means responsive to the absence of said error signals, one of said second counter means outputs and said first register means first stage representing a one bit for clearing said second counter, means responsive to the absence of said error signal a second of said counter means outputs and said first register means first stage representing a one bit for transferring in reverse order the contents of the first 2N stages of said first register means to the 2N stages of said second register means, means for verifying the accuracy of the code in said second counter means and producing a verify signal output indicative thereof, means responsive to said verify signal and a third count output of said second counter for comparing the contents of said second and third register means and producing an identity output when they are identical, means responsive to said identity output for decoding the code in the second register, and means responsive to a next to last output count of said counter and said verify signal for transferring the contents of said second register means to said third register means.

* * * * *